United States Patent
Chourasia et al.

(10) Patent No.: US 11,751,261 B2
(45) Date of Patent: Sep. 5, 2023

(54) SMART LINK MANAGEMENT (LINK POOLING)

(71) Applicant: QUALCOMM Incorporated, San Diego, CA (US)

(72) Inventors: Ajit Chourasia, San Diego, CA (US); Jaikanth Krishnaswamy, San Diego, CA (US); Vijaya Datta Mayyuri, San Diego, CA (US); Ken Takasaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/812,188

(22) Filed: Mar. 6, 2020

(65) Prior Publication Data

US 2021/0282200 A1 Sep. 9, 2021

(51) Int. Cl.
*H04W 76/12* (2018.01)
*H04W 16/02* (2009.01)

(52) U.S. Cl.
CPC ........... *H04W 76/12* (2018.02); *H04W 16/02* (2013.01)

(58) Field of Classification Search
CPC .............................. H04W 76/12; H04W 16/02
See application file for complete search history.

(56) References Cited

U.S. PATENT DOCUMENTS

| | | | | |
|---|---|---|---|---|
| 7,027,400 B2* | 4/2006 | O'Neill | | H04L 12/185 370/235 |
| 7,474,650 B2* | 1/2009 | O'Neill | | H04L 12/28 370/349 |
| 8,000,241 B2* | 8/2011 | O'Neill | | H04L 47/767 370/235 |
| 8,023,410 B2* | 9/2011 | O'Neill | | H04L 47/762 370/235 |
| 9,003,488 B2* | 4/2015 | Spencer | | H04W 8/22 726/3 |
| 9,071,330 B2* | 6/2015 | Frantz | | H04L 67/1068 |
| 9,131,266 B2* | 9/2015 | Guedalia | | H04N 21/25825 |
| 9,480,076 B2* | 10/2016 | Jung | | H04L 12/6418 |
| 9,952,851 B2* | 4/2018 | Aleksandrov | | H04L 67/327 |
| 9,998,901 B2* | 6/2018 | Qi | | H04W 8/005 |
| 10,129,751 B2* | 11/2018 | Singh | | H04W 84/12 |
| 10,327,274 B2* | 6/2019 | Subhan | | H04W 76/15 |
| 10,470,225 B2* | 11/2019 | Zhao | | H04W 8/183 |
| 10,554,530 B2* | 2/2020 | Thota | | H04L 67/1044 |
| 10,575,244 B1* | 2/2020 | Gustafson | | H04W 48/16 |
| 10,602,309 B2* | 3/2020 | Camps | | H04W 4/023 |
| 2009/0005167 A1* | 1/2009 | Arrasvuori | | H04M 1/72427 463/40 |
| 2012/0042000 A1* | 2/2012 | Heins | | G06Q 10/10 709/201 |
| 2012/0106475 A1* | 5/2012 | Jung | | H04W 72/1242 370/329 |

(Continued)

*Primary Examiner* — Gregory B Sefcheck
(74) *Attorney, Agent, or Firm* — QUALCOMM Incorporated

(57) ABSTRACT

A method of wireless communications forms a group with multiple UEs within a vicinity of a UE. The method establishes a tunnel between the UE and each of the UEs. The method also aggregates network resources obtained from a network interface of the UE and network resources shared by the UEs via each tunnel. The method provides the aggregated network resources to an application of the UE.

19 Claims, 8 Drawing Sheets

(56) References Cited

U.S. PATENT DOCUMENTS

| | | | | |
|---|---|---|---|---|
| 2013/0040576 | A1* | 2/2013 | Yoon | H04W 76/14 |
| | | | | 455/41.2 |
| 2014/0074923 | A1* | 3/2014 | Vasudevan | G06F 21/10 |
| | | | | 709/204 |
| 2014/0259012 | A1* | 9/2014 | Nandlall | G06F 9/45558 |
| | | | | 718/1 |
| 2014/0313902 | A1* | 10/2014 | Bruner | H04L 65/1095 |
| | | | | 370/235 |
| 2015/0016260 | A1* | 1/2015 | Chow | H04L 47/762 |
| | | | | 370/235 |
| 2015/0063098 | A1* | 3/2015 | Yavuz | H04W 52/343 |
| | | | | 370/254 |
| 2015/0206270 | A1* | 7/2015 | Brahmaroutu | G06F 3/14 |
| | | | | 345/520 |
| 2015/0373509 | A1* | 12/2015 | Wang | H04W 4/80 |
| | | | | 370/338 |
| 2016/0182134 | A1* | 6/2016 | Kol | H04W 72/082 |
| | | | | 370/329 |
| 2017/0142014 | A1* | 5/2017 | Vincent | H04L 47/31 |
| 2018/0035267 | A1* | 2/2018 | Barrett | H04W 76/45 |
| 2018/0103498 | A1* | 4/2018 | Subhan | H04L 61/5007 |
| 2020/0120725 | A1* | 4/2020 | Mildh | H04W 76/12 |
| 2021/0184894 | A1* | 6/2021 | Scarella | H04L 12/4633 |
| 2021/0274367 | A1* | 9/2021 | Cui | H04L 43/16 |

* cited by examiner

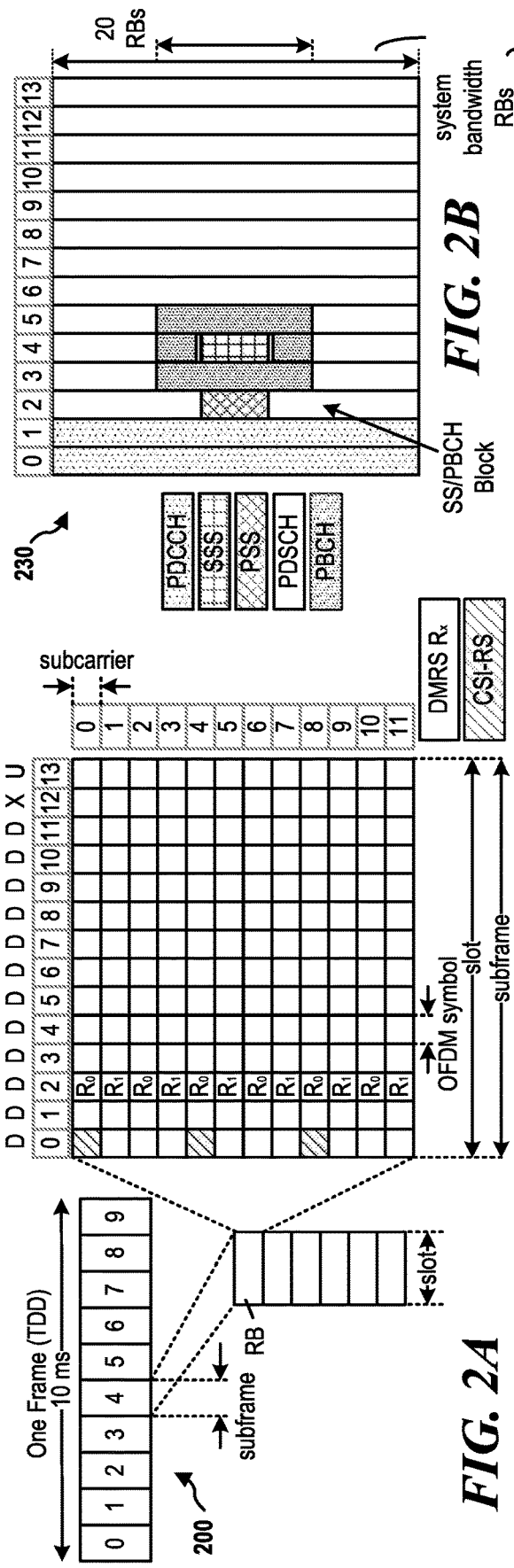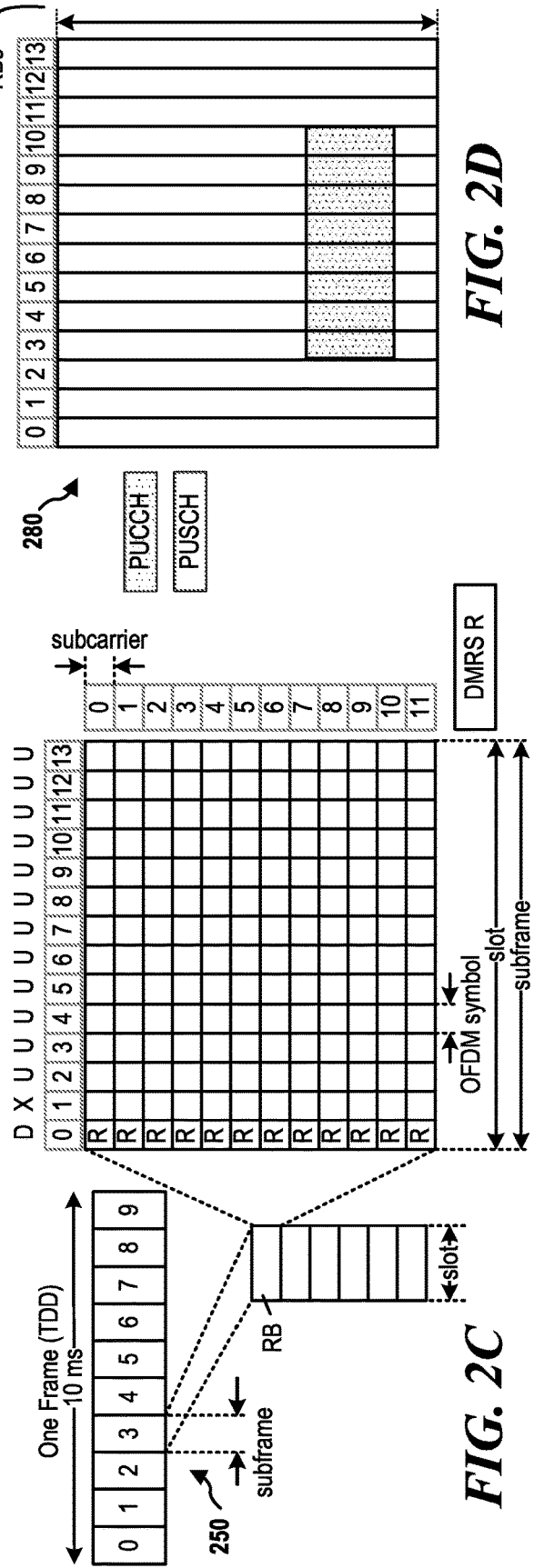

SMART LINK MANAGEMENT (LINK POOLING)

FIELD OF THE DISCLOSURE

Aspects of the present disclosure generally relate to wireless communications, and more particularly to techniques for data service link management among user equipments (UEs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

As the demand for mobile broadband access continues to increase, there exists a need for further improvements in NR and LTE technology. Preferably, these improvements should be applicable to other multi-access technologies and the telecommunications standards that employ these technologies

SUMMARY

In an aspect of the present disclosure, a method of wireless communications forms a group with multiple UEs within a vicinity of a UE. The method establishes a tunnel between the UE and each of the UEs. The method also aggregates network resources obtained from a network interface of the UE and network resources shared by the UEs via each tunnel. The method provides the aggregated network resources to an application of the UE.

In another aspect of the present disclosure, an apparatus for wireless communication includes means for forming a group with a group of UEs within a vicinity of a UE. The apparatus also includes means for establishing a tunnel between the UE and each of the plurality of UEs; and means for aggregating network resources obtained from a network interface of the UE and network resources shared by the group of UEs via each tunnel. The apparatus also includes means for providing the aggregated network resources to an application of the UE.

In yet another aspect, an apparatus for wireless communication includes at least one processor coupled to a memory and configured to form a group with multiple UEs within a vicinity of a UE. The processor(s) is also configured to establish a tunnel between the UE and each of the UEs; and to aggregate network resources obtained from a network interface of the UE and network resources shared by the UEs via each tunnel. The processor(s) is further configured to provide the aggregated network resources to an application of the UE.

In still another aspect, a computer readable medium stores program code for wireless communication. The program code is executed by at least one processor and includes program code to form a group with multiple UEs within a vicinity of a UE. The medium stores program code to establish a tunnel between the UE and each of the UEs; and program code to aggregate network resources obtained from a network interface of the UE and network resources shared by the UEs via each tunnel. The medium further stores program code to provide the aggregated network resources to an application of the UE.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily used as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

DETAILED DESCRIPTION

Figure 1:
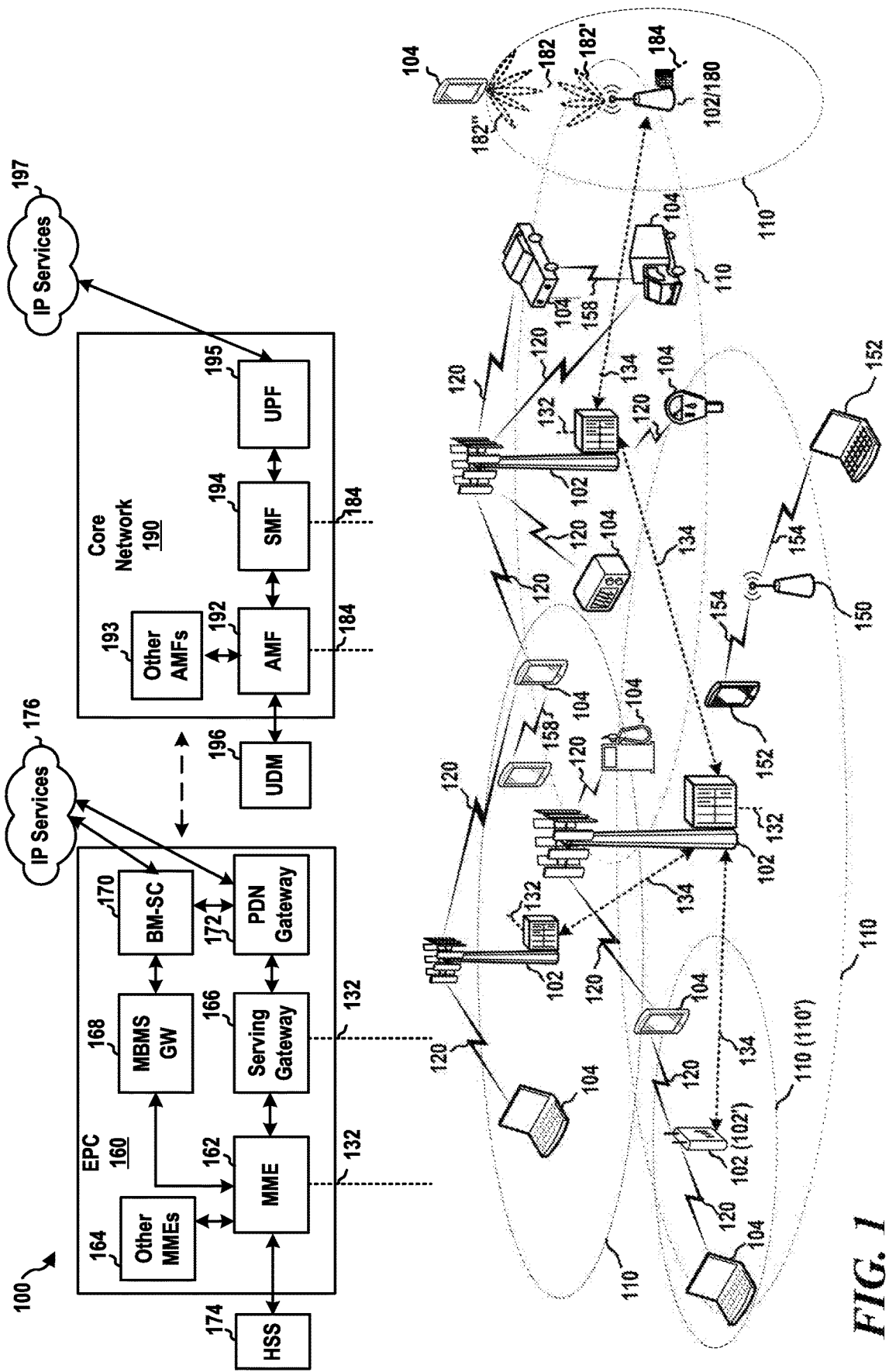
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As the use of wireless devices increases, users may experience reduced bandwidth for their wireless connections due to various factors. For example, bandwidth may be reduced due to limited network coverage (e.g., poor cellular network reception), increased load conditions (e.g., too many users on a public WiFi access point), and/or channel conditions (e.g., channel interference). The wireless connection may be a cellular connection or a WiFi connection. The reduced bandwidth decreases a quality of experience (QoE) for applications that are dependent on network connectivity.

As discussed, bandwidth may be reduced due to limited network coverage. For example, cellular network coverage may be limited in remote areas (e.g., a desert, forest, or hilltop) and areas with limited line of sight (e.g., a canyon). The QoE of various applications, such as navigation applications and video streaming applications, may decrease due to the limited network coverage.

Additionally, or alternatively, bandwidth may decrease due to increased load conditions. For example, a number of UEs connected to a public WiFi system access point may be greater than a threshold. The increased load condition may reduce a QoE when a UE accesses a public WiFi system, such as a WiFi system at an airport or a coffee shop.

Additionally, or alternatively, bandwidth may decrease due to one or more channel conditions. Channel conditions may include interference and reduced signal strength (e.g., received signal strength indicator). As such, channel conditions may reduce the QoE of applications dependent on the network connectivity.

In some cases, a group of users (e.g., a family, friends, etc.) may be traveling in close proximity to each other. Each user in the group may have a connected device (e.g., UE). The available bandwidth for each device may be insufficient to obtain an application's QoE. In contrast, an aggregated bandwidth of multiple devices from the group may be sufficient to obtain the application's QoE.

One or more user devices from the group of users may be connected to a same carrier, such as a WiFi hotspot. Still, a subset of all user devices, or all user devices, may be connected to different carriers. For example, a first user device from the group may be connected to a first cellular carrier and a second user device from the group may be connected to a second cellular carrier. As such, some devices may have more bandwidth than other devices.

As an example, each member of a family of four may have their own UE. On average, a bandwidth for each UE may be 150 Kbps. This bandwidth may be insufficient for streaming videos or establishing a video call. Still, if the bandwidth of the four devices is pooled, the overall bandwidth would be approximately 600 Kbps. The pooled bandwidth may be sufficient to obtain a good QoE for video streaming or video calling. That is, one user device from a group of users may aggregate resources from other user devices in the group of users.

Aspects of the present disclosure are directed to improving network bandwidth for one or more UEs by pooling resources via an improved link management system.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as for example, FlashLinQ, WiMedia, Bluetooth, ZigBee, WiFi based on the IEEE 802.11 standard, LTE, or NR.

The wireless communications system may further include a WiFi access point (AP) 150 in communication with WiFi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the WiFi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may form a group with multiple UEs within a vicinity of a UE. The UE 104 may also establish a tunnel between the UE and each of the UEs. The UE 104, may further aggregate network resources obtained from a network interface of the UE and network resources shared by the UEs via each tunnel. The UE 104 may still further provide the aggregated network resources to an application of the UE.

Although the following description may be focused on 5G NR, the herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
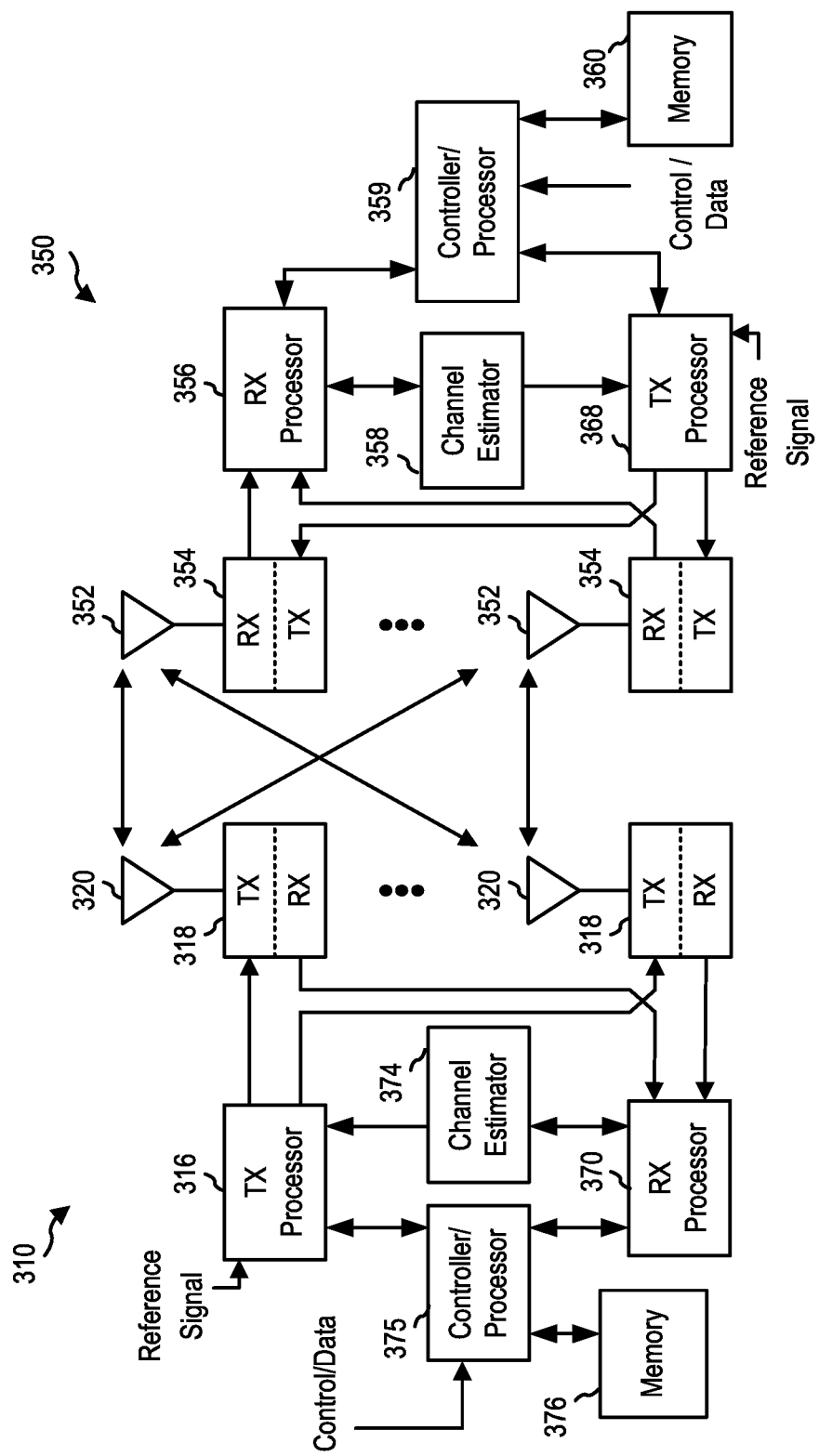
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1. Additionally, at least one of the TX processor 316, the RX processor 370, and the controller/processor 375 may be configured to perform aspects in connection with 198 or 199 of FIG. 1.

As discussed, aspects of the present disclosure are directed to pooling resources (e.g., bandwidth) of multiple UEs to improve a bandwidth of one or more UEs. An ad hoc network may be formed to aggregate the bandwidth of the multiple UEs (e.g., Internet connected devices). The ad hoc network distributes network traffic over network interfaces of the multiple UEs. For example, WiFi Direct, Internet protocol (IP) tunneling, IP routing, and/or other networking concepts may be used to distribute the network traffic. The ad hoc network may improve network throughput and/or reduce network latency.

In one configuration, the ad hoc network is formed in response to determining a quality of experience (QoE) of one or more applications on a UE. For example, if the QoE is less than a threshold, a group may be formed and a link pooling function may be applied to the group. The group includes multiple network entities (e.g., UEs). The QoE may be further monitored after applying the link pooling function.

As discussed, in one configuration, the QoE of one or more applications of a UE is monitored. By monitoring the QoE, the system may identify stalled audio and/or video, dropped packets, reduced frame rate, and/or the like. Various statistics of a UE and/or an application may be used to monitor the QoE. The statistics include, but are not limited to, network queue statistics, packet statistics, video statistics, audio statistics, and/or frame buffer captures.

The QoE monitoring component of a network entity may monitor one or more application specific metrics over a period of time. For example, the QoE monitoring component may monitor an uplink rate with respect to an uplink queue size. As another example, the QoE monitoring component monitors an uplink rate with respect to a confidence. In yet another example, the QoE monitoring component monitors an uplink queue size with respect to the confidence. The confidence metric may be a measurement of an accuracy of the collected performance indictor. For example when measuring a queue size, the queue size may change depending on an application, polling time, and/or network conditions. In this example, the confidence metric may indicates a confidence in the queue size value based on the various conditions.

In still yet another example, the QoE monitoring may monitor the uplink queue size. In the current examples, the QoE monitoring component may determine that a size of an uplink queue is increasing because data cannot be uploaded and/or downloaded at a rate to satisfy an application's requisite uplink and/or downlink rate. The QoE monitoring component may periodically or continuously monitor one or more metrics.

In one configuration, the QoE monitoring component uses video and/or audio decoder firmware metrics to identify dropped packets, frames per second, and/or other statistics. For example, frames per second may measure a video's frame rate. If the frames per second for a video streaming application is below a threshold, such as fifteen frames per second, the QoE monitoring component may determine that the QoE of the video streaming application is not satisfied.

For certain applications, such as gaming applications, one or more metrics, such as frames per second and/or link speed, are displayed on each frame. For example, in a multiplayer online battle arena (MOBA) game, if the frames per second is less than a threshold, the QoE for the game may be unsatisfactory. Video games may output the frames per second and/or link speed during gameplay for users to determine if their bandwidth is suitable for the game.

In one configuration, the QoE monitoring component captures a video frame from a game, or another application, and processes the video frame capture (e.g., screen image) to obtain one or more metrics. The metrics may be obtained by classifying portions of the captured frame. The metric may be used to determine the QoE. For example, a captured frame may be scraped for metrics (e.g., latency). Optical character recognition (OCR) may convert the scraped metrics to determine link metrics (e.g., frames per second).

In one configuration, when the QoE monitoring component determines that the QoE of an application is not satisfied, the QoE monitoring component requests peer group members to share their backhaul connections. For example, the QoE monitoring component requests user devices to share their backhaul connections if the network is congested or throughput is less than a threshold. In one example, the backhaul connections are shared via WiFi Direct™.

The QoE monitoring component may use various methods to determine a QoE of an application and/or network latency. Aspects of the present disclosure are not limited to the aforementioned methods for monitoring the QoE. Other methods may determine the QoE of an application and/or network latency.

The QoE may be monitored for applications of a network connected device, such as a UE, personal computer, or another type of device. In one configuration, an ad hoc network is formed to alleviate the reduced network bandwidth for a UE. A peer-to-peer (P2P) interface, such as WiFi Direct™, P2P may be used to form the ad hoc network. The P2P interface establishes a connection between network entities without the use of an access point. For example, two or more UEs may establish a direct WiFi connection without the use of a wireless router.

Various topologies may be used by the established group of devices. The topologies described are exemplary topologies. Aspects of the present disclosure are not limited to the discussed topologies. A P2P group owner may be a topology manager that dictates an overlay of tunneling over P2P interfaces. For example, the network may be a 1×N network or an N×N Network. The tunneling may be IP-in-IP (IPIP) tunneling or another type of tunneling.

Figure 4:
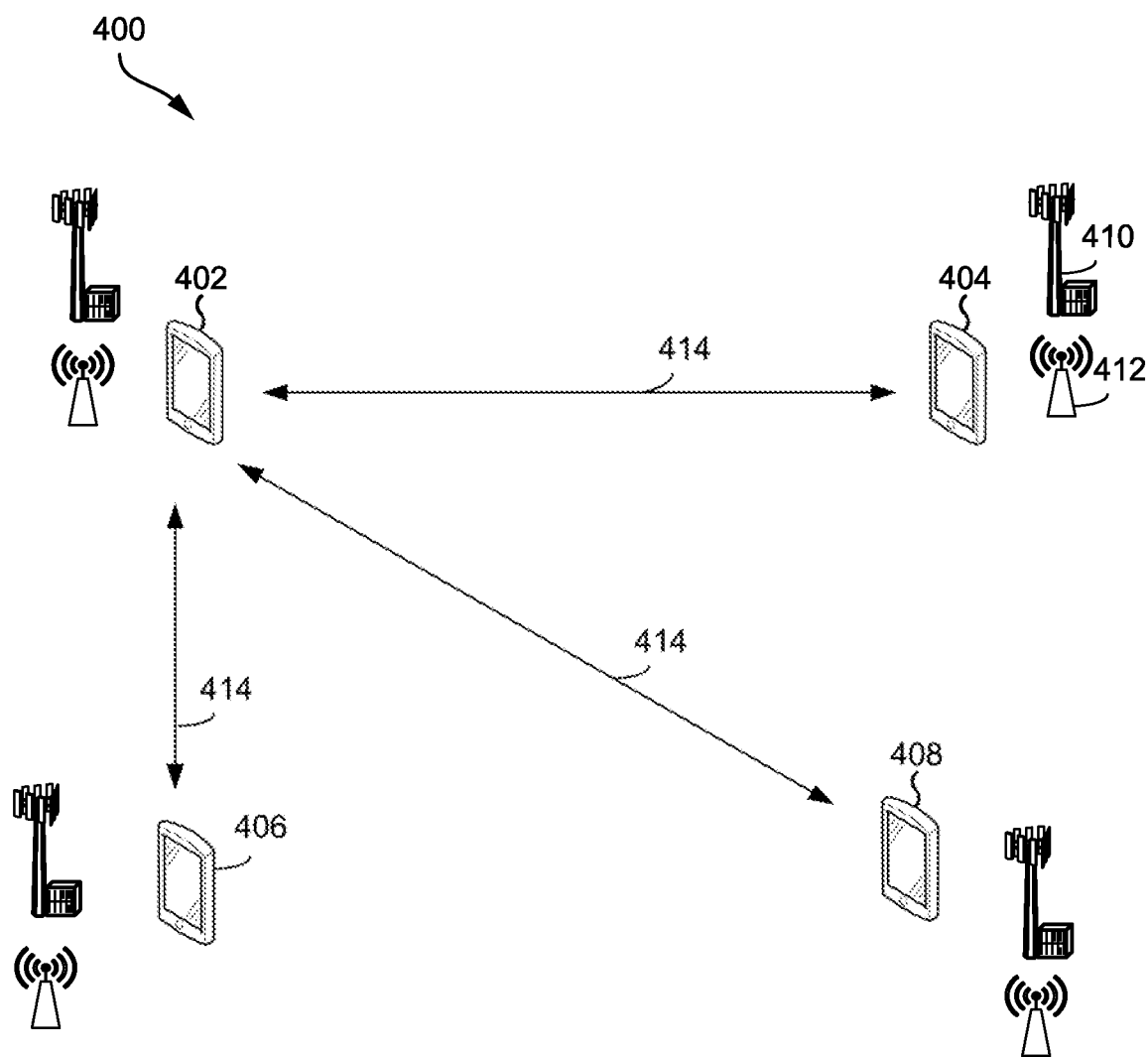
FIGS. 4 and 5 illustrate examples of network topologies in accordance with various aspects of the present disclosure.

FIG. 4 illustrates an example of a 1×N ad hoc network 400 according to aspects of the present disclosure. As shown in FIG. 4, the 1×N ad hoc network 400 includes four network entities 402, 404, 406, 408. For brevity, the network entities of FIGS. 4 and 5 will be referred to as UEs. Aspects of the present disclosure are not limited to UEs and are contemplated for other types of network entities, such as a personal computer, tablet, or another device.

Each UE 402, 404, 406, 408 may be connected to one or more network interfaces 410, 412 via a backhaul connection (not shown). For example, the first UE 402 may be connected to a cellular interface 410 and/or a WiFi interface 412. Additionally, each UE 402, 404, 406, 408 is within a range of the other UE 402, 404, 406, 408, such that the UEs 402, 404, 406, 408 may share resources via one or more tunnels 414.

The 1×N ad hoc network 400 may be formed when a QoE monitoring component of the first UE 402 determines that the QoE of an application of the first UE 402 is not satisfied. For example, the QoE monitoring component may determine that network congestion is greater than a threshold and or network latency is less than a threshold. The group of UEs 402, 404, 406, 408 may be grouped via the P2P interface.

The connection to the cellular interface 410 may be metered and the connection to the WiFi interface 412 may be unmetered. An interface is metered when there is a cost associated with data usage via the interface. For example, because users pay a fee based on an amount of cellular data, the cellular interface 410 is considered a metered interface.

One or more of the UEs 402, 404, 406, 408 may be connected to the same interfaces 410, 412. Alternatively, each UE 402, 404, 406, 408 may be connected to a different interface 410, 412. For example, each UE 402, 404, 406, 408 may be connected to a different WiFi access point 412 and/or a different cellular operator 410.

The first UE 402 may be a peer-to-peer group owner. As discussed, the peer-to-peer group owner manages a topology and dictates a tunneling overlay. The remaining UEs 404, 406, 408 may be peer-to-peer clients. The first UE 402 establishes encrypted tunnels 414 with each of the remaining UEs 404, 406, 408 after forming the ad hoc network over the peer-to-peer interface.

For example, as shown in FIG. 4, the first UE 402 establishes an encrypted tunnel 414 over sockets 12-21 with a second UE 404, an encrypted tunnel 414 over sockets 13-31 with a third UE 406, and an encrypted tunnel 414 over sockets 14-41 with a fourth UE 408. The peer-to-peer client UEs 404, 406, 408 may share their network resources with the first UE 402, thereby increasing the first UE's 402 bandwidth. Specifically, the first UE 402 may use network resources available via its own connections with the cellular operator 410 and/or the WiFi operator 412 as well as the shared network resources obtained from the backhaul connections of each peer-to-peer client (e.g., the second, third, and fourth network entities 404, 406, 408).

That is, the second, third, and fourth UEs 404, 406, 408 may share resources obtained via the backhaul connection to the cellular interface 410 and/or the WiFi interface 412. Each UE 404, 406, 408 may control an amount of resources (e.g., bandwidth) shared with the first UE 402. For example, the second UE 404 may only have a one Mb/s connection. The second UE 404 may control a percentage of the available bandwidth to share with the first UE 402.

Figure 5:
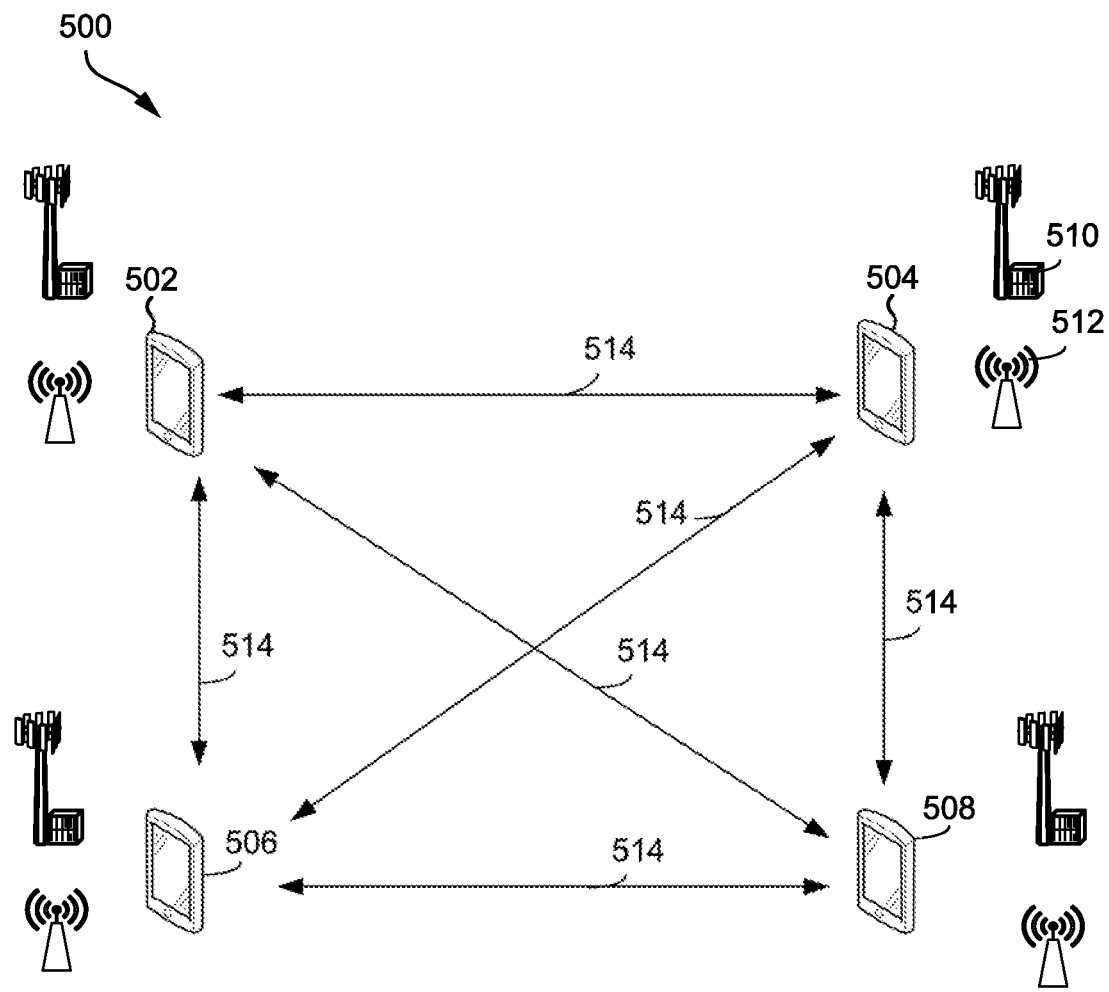

FIG. 5 illustrates an example of an N×N ad hoc network 500 according to aspects of the present disclosure. The N×N ad hoc network 500 may be referred to as a full mesh network. As shown in FIG. 5, the N×N ad hoc network 500 includes four UEs 502, 504, 506, 508. Each UE 502, 504, 506, 508 may be connected to one or more network interfaces 510, 512 via a backhaul connection (not shown). For example, the first network operator may be connected to a cellular interface 510 and/or a WiFi interface 512.

One or more of the UEs 502, 504, 506, 508 may be connected to the same interfaces 510, 512. Alternatively, each UE 502, 504, 506, 508 may be connected to a different interface 510, 512. For example, each UE 502, 504, 506, 508 may be connected to a different WiFi access point.

In the example of FIG. 5, the second, third, and fourth UEs 504, 506, 508 are not limited to only sharing network resources with the first UE 502. In contrast to the 1×N network 400, each UE 502, 504, 506, 508 may share network resources with another UE 502, 504, 506, 508 as well as receive shared network resources from another UE 502, 504, 506, 508, via encrypted tunnels 514. For example, the third UE 506 may share network resources with the first UE 502 while also receiving network resources shared by the fourth UE 508.

The number of UEs in a group is not limited to the number of entities shown in the examples of FIGS. 4 and 5. Additional or fewer UEs may form a group (e.g., an ad hoc network). The group formation process may include multiples stages, such as a connection management stage, a topology management stage, and a routing management stage.

During the connection management stage, multiple network entities discover each other and form a P2P group. Network entities may be discovered over a P2P interface. Existing P2P standards may be used for the discovery. In one configuration, a non-autonomous group owner is established and other network entities are categorized as clients. In one configuration, the P2P network only has one group owner.

Tunneling (e.g., IPIP tunneling) may be established during the topology management stage. The tunneling exposes individual interfaces in the system. The tunneling may also assign IP addresses, manage trust between devices, and provide secure/private connections. The trust may be performed using device level certificates, block chain, or other trust methods. For security, the transmissions may be encrypted via application level end-to-end encryption and/or an encrypted tunnel. The encryption and established trust secure the data shared between devices.

A network entity shares network resources with another network entity by managing the tunnel interface. The tunnel interface may be managed by IP rules, traffic shaping, and/or bandwidth control. The sharing entity may also share a specific network interface. For example, the sharing entity may allow sharing of only a non-metered interface, rather than a metered interface.

In the examples of FIGS. 4-5, an amount of shared resources may be dynamically updated based on a link quality of available interfaces (e.g., WiFi or cellular). One or more measurement techniques may determine the link quality of the available interfaces. The link characteristics may include an available link rate (e.g., throughput) and/or network latency. Some applications, such as voice over IP, are more sensitive to latency than throughput. Therefore, link characteristics may be determined for the needs of a specific application. A link rate may be determined by monitoring HTTP/HTTPs traffic.

Figure 6:
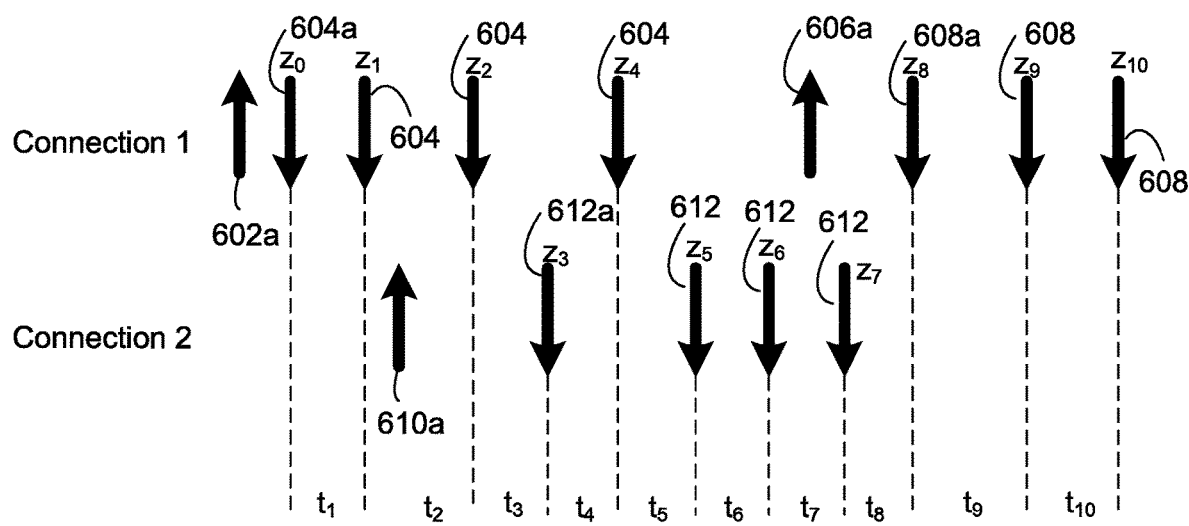
FIG. 6 is a diagram illustrating an example of uplink and downlink transmissions in accordance with various aspects of the present disclosure.

Specifically, the request/response nature of HTTP/HTTPs may be used to estimate the link rate. FIG. 6 illustrates an example of link rate estimation according to aspects of the present disclosure. As shown in FIG. 6, uplink packets 602, 606, 610 and downlink packets 604, 608, 612 may be transmitted and received on a first connection and a second connection. Uplink packets 602, 606, 610 correspond to uplink messages (e.g., HTTP GET). Downlink packets 604, 608, 612 may be transmitted in response to one or more uplink packets 602. Each downlink packet 604, 608, 612 may have a different packet size $z_n$ and a different inter-arrival time $t_n$.

In one configuration, an initial downlink packet 604a, 608a, 612a in response to an uplink packet 602a, 606a, 610a on each connection (e.g., connection 1 and connection 2) is used as a marker to reference subsequent downlink packets 604, 608, 612 and their arrival times. A QoE monitoring component may record packet lengths z1, z2, z4, z5, z6, z7, z9, z10 and inter-packet times t1, t2, t4, t5, t6, t7, t9, t10. The estimated link rate may be determined using a ratio of total packet lengths over total inter-packet time ($\Sigma z_n/\Sigma t_n$). That is, the link rate is estimated on consolidated packet statistics. To improve accuracy, a number of packages used for the estimation should be greater than a packet threshold. In one configuration, stale (or outdated) entries are ignored.

In FIG. 6, a first set of downlink packets 604 are responses to a first uplink message 602a. An initial first downlink packet 604a is included in the first set of downlink packets 604. When estimating the link rate, a roundtrip delay time between the first uplink message 602a and the initial first downlink packet 604a may be ignored as the time may be delayed due to a server lookup. As such, in this example, only the roundtrip time between the first set of downlink packets 604 may be used to compute the amount of data received by the time it took to receive the data.

Operating systems, such as Android and Linux, provide mechanisms to query a current link rate/bandwidth on a given network interface. Additionally, or alternatively, an operating system may provide a number of network packets being transmitted or received over a given interface. The information provided by the operating system may be used to estimate a link rate.

In one configuration, periodic Internet control message protocol (ICMP) messages may be initiated on all available interfaces to the same ICMP destination. The system performs a running average of a round trip time (RTT) for each interface and these values may identify the fastest interface.

Additionally, or alternatively, periodic HTTP requests may be transmitted to a well-known host. The HTTP request and response may be used to calculate the latency. Separate HTTP requests may be sent on all available interfaces to compute respective latencies on each interface.

Different applications may have different network requirements. Some applications may benefit from distributing/aggregating data over all the available interfaces. In contrast, other applications may be improved by selecting a fastest interface from all available interfaces. As such, it is desirable to manage a link based on a type of application.

A link may be selected after estimating a link rate. A function may be used for distributing sockets for a given application over multiple links to provide a desired QoE. The function may rate different interfaces based on a QoE in view of costs. Costs may be based on a dollar amount of a network connection, resource use, and/or other factors. In one configuration, the function uses a probability distribution for subsequent connection on multiple (N) interfaces.

The function considers various factors when distributing sockets over multiple links. For example, the function may consider whether an interface is metered or unmetered. The function may also consider a target throughput of the smart link aggregation (SLA). The SLA is the minimum level of service that a carrier delivers per a carrier agreement.

In one configuration, the function determines if an unmetered interface participates in an SLA. This parameter may define a threshold below which an unmetered interface will not participate in the SLA. The function may also use a parameter to define a threshold below which a metered interface will not participate in the SLA The function may also consider a total target that may be achieved. The total target may be a sum of the throughput from all available interfaces. The function may further consider a target throughput and the link rate estimation determined from the ratio $\Sigma z_n/\Sigma t_n$.

In one configuration, when distributing the N interfaces, the function considers the target throughput for the SLA. The function then gathers statistics from the N interfaces and determines the metered interfaces, unmetered interfaces, and a link rate estimation for the metered and unmetered interfaces. The function may weigh unmetered interfaces over metered interfaces. Additionally, the function distributes the interfaces based on a comparison of a throughput of unmetered interfaces to the target throughput for the SLA. A minimum cost distribution function identify interfaces with the least cost.

Applications that do not use many sockets may prefer using the fastest link among the available interfaces. An estimated latency (e.g., round trip time (RTT)) may identify the fastest interface. Similar logic may select an interface based on the estimated throughput of the individual links/interfaces.

In one configuration, a secure tunnel is established between the two peer group members when a pooling request is accepted by a peer group member. An IP table rule for the IP packets may be created on the connecting peer group members. As discussed, a requestor establishes a link between itself and other peer group members (e.g., network entities). Accordingly, multiple network interfaces may be opened on the requestor, where the other group members serve as a backhaul connection.

In one configuration, network traffic is distributed when one network entity is accessing a universal resource locator (URL) over all the network interfaces. The network entity may include a physical network interface (e.g., WiFi and/or cellular) as well as newly opened network interfaces created via P2P negotiations. The network traffic shared across the available interfaces may be dynamically allocated based on various characteristics, such as, but not limited to, throughput, cost per bit, cost per watt, and/or latency. The criteria for selecting a network interface or multiple interfaces may be based on QoE needs of an application.

As discussed, network throughput shared to a specific network entity may be dynamically allocated, or limited. In one configuration, IP rules limit a shared bandwidth. The sharing entity may also share a specific network interface, such as WiFi or cellular. For example, the sharing entity may only share the non-metered interface (e.g., WiFi) rather than the metered interface (e.g., cellular).

Different network topologies may also be implemented based on group rules. For example, a 1×N topology may be implemented. The 1×N topology includes only one group owner that initiates a request to form a group. The group owner may receive shared resources from other network entities.

As another example, an N×N topology may be implemented. The N×N topology is a mesh topology where any group member may receive resources shared from another network entity. In one configuration, to prevent circulation of network packets between group members, the system measures a packet's hop count. The hop count may be provided to a packet originator (e.g., group member). The packet originator may prune its precedence for a subsequent network hop or routing rules.

Additionally, the system may perform self-pruning by removing a network interface as a group member. The network interface may be removed if the interface is out of coverage or if a peer connection is dropped.

As indicated above, FIGS. 4-6 are provided as examples. Other examples may differ from what is described with respect to FIGS. 4-6.

Figure 7:
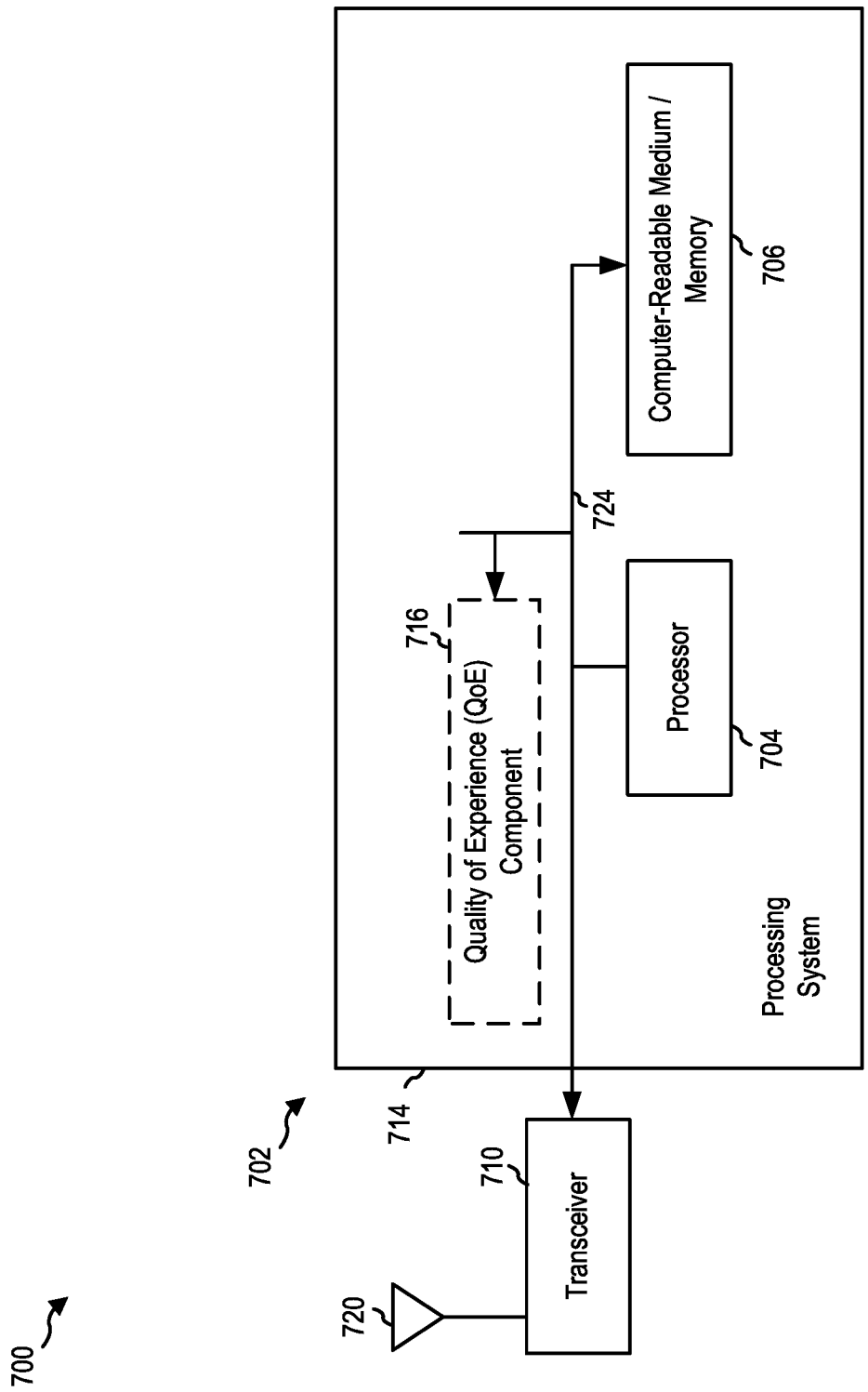
FIG. 7 is a diagram illustrating an example of a hardware implementation for an apparatus employing a processing system.

FIG. 7 is a diagram 700 illustrating an example of a hardware implementation for an apparatus 702 employing a processing system 714. The processing system 714 may be implemented with a bus architecture, represented generally by a bus 724. The bus 724 may include any number of interconnecting buses and bridges depending on the specific application of the processing system 714 and the overall design constraints. The bus 724 links together various circuits including one or more processors and/or hardware components, represented by a processor 704, a quality of experience (QoE) component 716, and a computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714. In addition, the transceiver 710 receives information from the processing system 714 and based on the received information, generates a signal to be applied to the one or more antennas 720.

The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least the QoE component 716. The QoE component 716 may form a group with multiple UEs within a vicinity of a UE. The QoE component 716 may also establish a tunnel between the UE and each of the UEs. The QoE component 716 may further aggregate network resources obtained from a network interface of the UE and network resources shared by the UEs via each tunnel. The QoE component 716 may still further provide the aggregated network resources to an application of the UE.

The component may be software a component running in the processor 704, resident/stored in the computer readable medium/memory 706, one or more hardware components coupled to the processor 704, or some combination thereof. The processing system 714 may be a component of the base station 310 and may include the memory 376 and/or at least one of the TX processor 316, the RX processor 370, and the controller/processor 375. Alternatively, the processing system 714 may be the entire base station (e.g., see base station 310 of FIG. 3). The processing system 714 may be a component of the UE 350 and may include the memory 360 and/or at least one of the TX processor 368, the RX processor 356, and the controller/processor 359. Alternatively, the processing system 714 may be the entire UE (e.g., see UE 350 of FIG. 3).

In one configuration, the apparatus 702 for wireless communications includes means for forming a group with multiple UEs within a vicinity of a UE. The apparatus 702 also includes means for establishing a tunnel between the UE and each of the multiple UEs. The apparatus 702 further includes means for aggregating network resources obtained from a network interface of the UE and network resources shared by the multiple UEs via each tunnel. The apparatus 702 still further includes means for providing the aggregated network resources to an application of the UE.

The aforementioned means may be one or more of the aforementioned components of the processing system 714 configured to perform the functions recited by the aforementioned means. As described supra, the processing system 714 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means. The aforementioned means may be one or more of the aforementioned components of the processing system 714 configured to perform the functions recited by the aforementioned means. As described supra, the processing system 714 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 8:
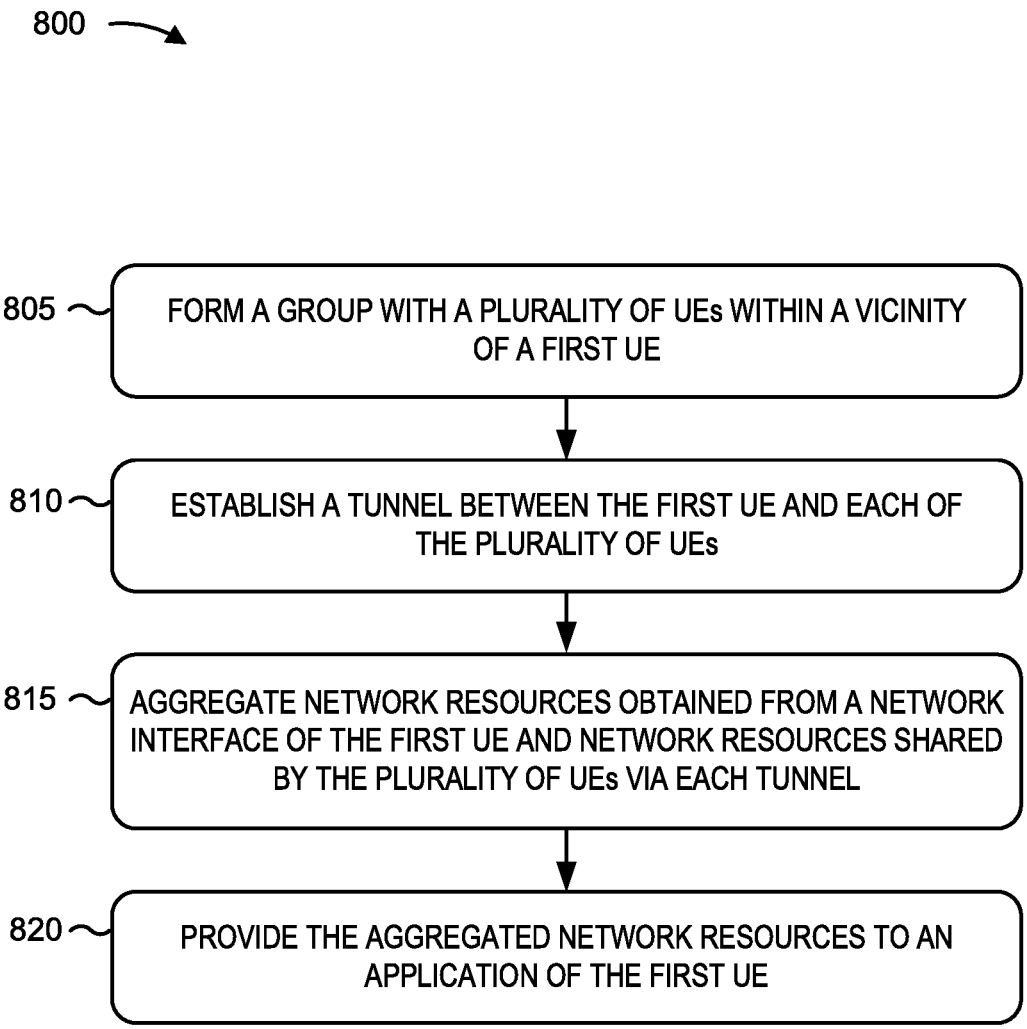
FIG. 8 is a diagram illustrating an example process performed, for example, by a user equipment (UE), in accordance with various aspects of the present disclosure.

FIG. 8 is a flowchart of an example process 800 performed, for example, by a UE (user equipment), in accordance with various aspects of the present disclosure. The example process 800 is an example of a smart link management (link pooling).

As shown in FIG. 8, in some aspects, the process 800 may include forming a group with a plurality of UEs within a vicinity of a UE (block 805). For example, the UE (e.g., using the antenna 352, RX/TX 354, RX processor 356, TX processor 368, controller/processor 359, memory 360, and or the like) can form a group with a plurality of UEs.

As shown in FIG. 8, in some aspects, the process 800 may include establishing a tunnel between the UE and each of the plurality of UEs (block 810). For example, the UE (e.g., using the antenna 352, RX/TX 354, RX processor 356, TX processor 368, controller/processor 359, memory 360, and or the like) can establishing a tunnel between the UE and each of the plurality of UEs.

As shown in FIG. 8, in some aspects, the process 800 may include aggregating network resources obtained from a network interface of the UE and network resources shared by the plurality of UEs via each tunnel (block 815). For example, the UE (e.g., using the controller/processor 359, memory 360, and or the like) can aggregate network resources via each tunnel.

As shown in FIG. 8, in some aspects, the process 800 may include providing the aggregated network resources to an application of the UE (block 820). For example, the UE (e.g., using the controller/processor 359, memory 360, and or the like) can provide the aggregated network resources. For example, the application may be a mobile gaming application, such as a MOBA game.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications at a User Equipment (UE), comprising:
   forming a group with a plurality of UEs within a vicinity of the UE, wherein the vicinity comprises at least one of a cellular network or a WiFi network, forming an ad hoc wireless network;
   establishing a tunnel between the UE and each of the plurality of UEs;
   aggregating uplink network resources obtained from a network interface of the UE and network resources shared by the plurality of UEs via each tunnel within the ad hoc wireless network when the UE has insufficient wireless network resources for an application, wherein the aggregated uplink network resources comprise a resource from the cellular network, a resource from the WiFi network and a resource from a backhaul network and wherein the aggregated uplink network resources are dynamically updated based on a link quality of the interface and the link quality is based on a running average of a round trip time (RTT) for the interface using periodic Internet control message protocol (ICMP) messages; and
   providing the aggregated uplink network resources to the application of the UE, wherein the application comprises a mobile game application to be played on the UE.

2. The method of claim 1, further comprising forming the group when at least one of a throughput of the network interface of the UE is less than a throughput threshold, a latency of the network interface of the UE is less than a latency threshold, or a combination thereof.

3. The method of claim 1, further comprising forming the group via a peer-to-peer interface, in the UE determines a topology of the tunnels between the UE and each of the plurality of UEs.

4. The method of claim 1, in which the network resources shared by the plurality of UEs are obtained from a metered network interface or an unmetered network interface.

5. The method of claim 1, in which the UE comprises a plurality of network interfaces and each of the plurality of UEs serves as a backhaul to the UE.

6. The method of claim 1, in which each of the plurality of UEs dynamically allocates the network resources shared with the UE.

7. A user equipment (UE) for wireless communication, comprising:
   a memory, and at least one processor operatively coupled to the memory, the memory and the at least one processor configured:
  to form a group with a plurality of UEs within a vicinity of the UE, wherein the vicinity comprises at least one of a cellular network or a WiFi network, forming an ad hoc wireless network;
  to establish a tunnel between the UE and each of the plurality of UEs;
  to aggregate uplink network resources obtained from a network interface of the UE and network resources shared by the plurality of UEs via each tunnel within the ad hoc wireless network when the UE has insufficient wireless network resources for an application, wherein the aggregated uplink network resources comprise a resource from the cellular network, a resource from the WiFi network and a resource from a backhaul network and wherein the aggregated uplink network resources are dynamically updated based on a link quality of the interface and the link quality is based on a running average of a round trip time (RTT) for the interface using periodic Internet control message protocol (ICMP) messages; and
  to provide the aggregated uplink network resources to the application of the UE, wherein the application comprises a mobile game application to be played on the UE.

8. The UE of claim 7, in which the at least one processor is further configured to form the group when at least one of a throughput of the network interface of the UE is less than a throughput threshold, a latency of the network interface of the UE is less than a latency threshold, or a combination thereof.

9. The UE of claim 7, in which the at least one processor is further configured to form the group via a peer-to-peer interface, in the UE determines a topology of the tunnels between the UE and each of the plurality of UEs.

10. The UE of claim 7, in which the network resources shared by the plurality of UEs are obtained from a metered network interface or an unmetered network interface.

11. The UE of claim 7, in which the UE comprises a plurality of network interfaces and each of the plurality of UEs serves as a backhaul to the UE.

12. The UE of claim 7, in which each of the plurality of UEs dynamically allocates the network resources shared with the UE.

13. An apparatus at a User Equipment (UE) for wireless communication, comprising:
  means for forming a group with a plurality of UEs within a vicinity of the UE, wherein the vicinity comprises at least one of a cellular network or a WiFi network, forming an ad hoc wireless network;
  means for establishing a tunnel between the UE and each of the plurality of UEs;
  means for aggregating uplink network resources obtained from a network interface of the UE and network resources shared by the plurality of UEs via each tunnel within the ad hoc wireless network when the UE has insufficient wireless network resources for an application, wherein the aggregated uplink network resources comprise a resource from the cellular network, a resource from the WiFi network and a resource from a backhaul network and wherein the aggregated uplink network resources are dynamically updated based on a link quality of the interface and the link quality is based on a running average of a round trip time (RTT) for the interface using periodic Internet control message protocol (ICMP) messages; and
  means for providing the aggregated uplink network resources to the application of the UE, wherein the application comprises a mobile game application to be played on the UE.

14. The apparatus of claim 13, further comprising means for forming the group when at least one of a throughput of the network interface of the UE is less than a throughput threshold, a latency of the network interface of the UE is less than a latency threshold, or a combination thereof.

15. The apparatus of claim 13, further comprising means for forming the group via a peer-to-peer interface, in the UE determines a topology of the tunnels between the UE and each of the plurality of UEs.

16. The apparatus of claim 13, in which the network resources shared by the plurality of UEs are obtained from a metered network interface or an unmetered network interface.

17. The apparatus of claim 13, in which the UE comprises a plurality of network interfaces and each of the plurality of UEs serves as a backhaul to the UE.

18. The apparatus of claim 13, in which each of the plurality of UEs dynamically allocates the network resources shared with the UE.

19. A non-transitory computer-readable medium at a User Equipment (UE) having program code recorded thereon, the program code executed by one or more processors and comprising:
  program code to form a group with a plurality of UEs within a vicinity of the UE; wherein the vicinity comprises at least one of a cellular network or a WiFi network, forming an ad hoc wireless network;
  program code to establish a tunnel between the UE and each of the plurality of UEs;
  program code to aggregate uplink network resources obtained from a network interface of the UE and network resources shared by the plurality of UEs via each tunnel within the ad hoc wireless network when the UE has insufficient wireless network resources for an application, wherein the aggregated uplink network resources comprise a resource from the cellular network, a resource from the WiFi network and a resource from a backhaul network and wherein the aggregated uplink network resources are dynamically updated based on a link quality of the interface and the link quality is based on a running average of a round trip time (RTT) for the interface using periodic Internet control message protocol (ICMP) messages; and
  program code to provide the aggregated uplink network resources to the application of the UE, wherein the application comprises a mobile game application to be played on the UE.

* * * * *